United States Patent
Obermeyer et al.

(10) Patent No.: US 8,812,027 B2
(45) Date of Patent: Aug. 19, 2014

(54) GEO-FENCE ENTRY AND EXIT NOTIFICATION SYSTEM

(75) Inventors: Lance Obermeyer, Austin, TX (US); Andrew Oliver, Austin, TX (US); Kyle Miller, Austin, TX (US); Prashant Shetty, Austin, TX (US); Aditya Rustgi, Austin, TX (US)

(73) Assignee: Phunware, Inc., Austin, TX (US)

( * ) Notice: Subject to any disclaimer, the term of this patent is extended or adjusted under 35 U.S.C. 154(b) by 190 days.

(21) Appl. No.: 13/586,127

(22) Filed: Aug. 15, 2012

(65) Prior Publication Data

US 2013/0045760 A1   Feb. 21, 2013

Related U.S. Application Data

(60) Provisional application No. 61/525,565, filed on Aug. 19, 2011.

(51) Int. Cl.
| | |
|---|---|
| *H04W 24/00* | (2009.01) |
| *H04W 4/02* | (2009.01) |
| *G01S 5/02* | (2010.01) |
| *G08B 21/02* | (2006.01) |

(52) U.S. Cl.
CPC .......... *H04W 4/021* (2013.01); *G08B 21/0288* (2013.01); *G08B 21/0283* (2013.01); *G08B 21/0277* (2013.01); *G01S 5/0263* (2013.01)
USPC .................. 455/456.2; 455/456.1; 455/456.6

(58) Field of Classification Search
CPC ............. G01S 5/0263; G08B 21/0277; G08B 21/0283; G08B 21/0288; H04W 4/021
USPC ................. 455/456.1, 456.2, 456.6
See application file for complete search history.

(56) References Cited

U.S. PATENT DOCUMENTS

| | | | |
|---|---|---|---|
| 2008/0274752 A1 | 11/2008 | Houri | |
| 2008/0278309 A1 | 11/2008 | Troxler | |
| 2009/0170528 A1 | 7/2009 | Bull et al. | |
| 2010/0279706 A1* | 11/2010 | Dicke | 455/456.1 |
| 2012/0122487 A1* | 5/2012 | Holm et al. | 455/456.2 |

OTHER PUBLICATIONS

International Search Report from corresponding PCT patent application PCT/US12/50603 dated Oct. 23, 2012; 3 pages.

* cited by examiner

*Primary Examiner* — Opiribo Georgewill
(74) *Attorney, Agent, or Firm* — John A. Fortkort; Fortkort & Houston P.C.

(57) ABSTRACT

A method is provided for determining when a mobile communications device has crossed a geo-fence. The method comprises (a) providing a mobile communications device (209) equipped with an operating system and having a location detection application resident thereon, wherein the mobile communications device is in communication with a server (211) over a network (203), and wherein the server maintains a geo-fence database (213); (b) receiving, from the operating system, a notification that (i) the location of the mobile communications device has changed by an amount that exceeds a predetermined threshold, or (ii) that a period of time has passed; (c) querying the operating system for a data set comprising the general location of the mobile communications device and the corresponding location accuracy; (d) transmitting the data set to the server; and (e) receiving from the server, in response, a set of geo-fences (205) proximal to the general location.

17 Claims, 3 Drawing Sheets

GEO-FENCE ENTRY AND EXIT NOTIFICATION SYSTEM

CROSS REFERENCE TO RELATED APPLICATIONS

This application claims the benefit of U.S. Provisional Application No. 61/525,565, filed Aug. 19, 2011, having the same title, and having the same inventors, and which is incorporated herein by reference in its entirety.

FIELD OF THE DISCLOSURE

The present disclosure relates generally to mobile communications devices, and more particularly to methods and systems for determining when a mobile communications device has entered and exited a geo-fence.

BACKGROUND OF THE DISCLOSURE

Mobile communications device platforms such as the Apple iPhone and the Google Android have several features that make them useful as location detection devices. Location detection is important in mobile applications that require knowledge of whether a user is entering or exiting defined geographic areas known as geo-fences. For example, in location-based marketing, it is desirable for merchants to know when the user of a mobile device is in the proximity (e.g., within 1000 meters) of a retail store. In such a case, the merchant may wish, for example, to send the user a message with a coupon inviting them to come into the store.

Several methodologies have been developed in the art to determine the location of a mobile communications device at a given point in time. For example, the location of a device may be determined through triangulation of the cell towers the device is communicating with and the properties of the connection the device has with each of these towers. Since mobile communications devices are constantly in communication with nearby cell towers anyway, this approach involves little incremental energy usage by the device. Unfortunately, this method often yields inaccurate results, since the density of cell towers is often insufficiently large to provide meter-level resolution of the location of a device.

Wi-Fi triangulation may also be utilized to determine the location of a mobile communications device. This approach is analogous to cell tower triangulation, but uses Wi-Fi hot spots near the device to determine its position. Wi-Fi triangulation is used, for example, in the location system developed by Skyhook Wireless (Boston, Mass.). Unfortunately, the applicability of this technique is limited, since the set of known Wi-Fi hot spots is relatively small.

The Global Positioning System (GPS) may also be used to determine the location of a mobile communications device. GPS is a constellation of satellites that broadcast location data. This data allows a mobile communications device to determine its location through a triangulation calculation. Unfortunately, GPS signals are weak, and it is typically battery intensive for a mobile communications device to receive and process GPS location updates on an ongoing basis.

Regardless of the methodology used to determine the location of a mobile communications device at a given point in time, the problem exists of how to detect when the device has entered or exited a geo-fence. Typically, this is accomplished by requiring the device to periodically report its location to a server. The business logic resident in the server then determines whether the most recent location update is of interest. This technique is used, for example, by the commercial services GOOGLE LATITUDE® (www.google.com/latitude) and Xtify (www.xtify.com).

The technique of periodically reporting the current location of a mobile communications device to a server is problematic for several reasons. First of all, it raises privacy concerns, because the technique effectively builds a trail of the location of the device over time. Moreover, periodic reporting is also inefficient since, in order for the server to react to the event of a device crossing a geo-fence in a timely manner, the device must have a high location reporting rate. However, a high reporting rate consumes energy for both the detection and the submission steps of the process.

In addition, periodic reporting suffers from accuracy issues. In particular, since the energy profile of GPS is poor, periodic reporting schemes such as those employed in GOOGLE LATITUDE® do not use GPS for location detection. Consequently, the accuracy of the detected locations is reduced.

SUMMARY OF THE DISCLOSURE

In one aspect, a method is provided for determining when a mobile communications device has crossed a geo-fence. The method comprises (a) providing a mobile communications device equipped with an operating system and having a location detection application resident thereon, wherein the mobile communications device is in communication with a server over a network, and wherein the server maintains a geo-fence database; (b) receiving, from the operating system, a notification that (i) the location of the mobile communications device has changed by an amount that exceeds a predetermined threshold, or (ii) that a period of time has passed; (c) querying the operating system for a data set comprising the general location of the mobile communications device and the corresponding location accuracy; (d) transmitting the data set to the server; and (e) receiving from the server, in response to the transmission of the data set, a set of geo-fences proximal to the general location.

In another aspect, a method is provided for determining the location of a mobile communications device with respect to a geo-fence. The method comprises (a) ascertaining, at a first resolution, the proximity $p = p_1$ of the mobile communications device to a first geo-fence; and (b) if $|p_1| < k$, wherein $k \in R$, then ascertaining, at a second resolution, the proximity $p = p_2$ of the mobile communications device to the first geo-fence.

In a further aspect, a mobile communications device is provided which comprises (a) a tangible medium; and (b) a software program disposed in the tangible medium and containing suitable programming instructions which, when executed, cause the mobile communications device to ascertain, at a first resolution, the proximity $p = p_1$ of the mobile communications device to the first geo-fence and, if $|p_1| < k$, wherein k∈R, to ascertain, at a second resolution, the proximity $p=p_2$ of the mobile communications device to the first geo-fence.

In still another aspect, systems and mobile communications devices are provided for implementing the foregoing methods.

DETAILED DESCRIPTION

It will be appreciated from the foregoing that there is a need in the art for a means for detecting when a mobile communications device crosses a geo-fence. There is further a need in the art for such a means that is private, efficient, accurate, and not battery intensive when implemented on a mobile communications device. These and other needs may be addressed by the systems and methodologies disclosed herein.

Figure 1:
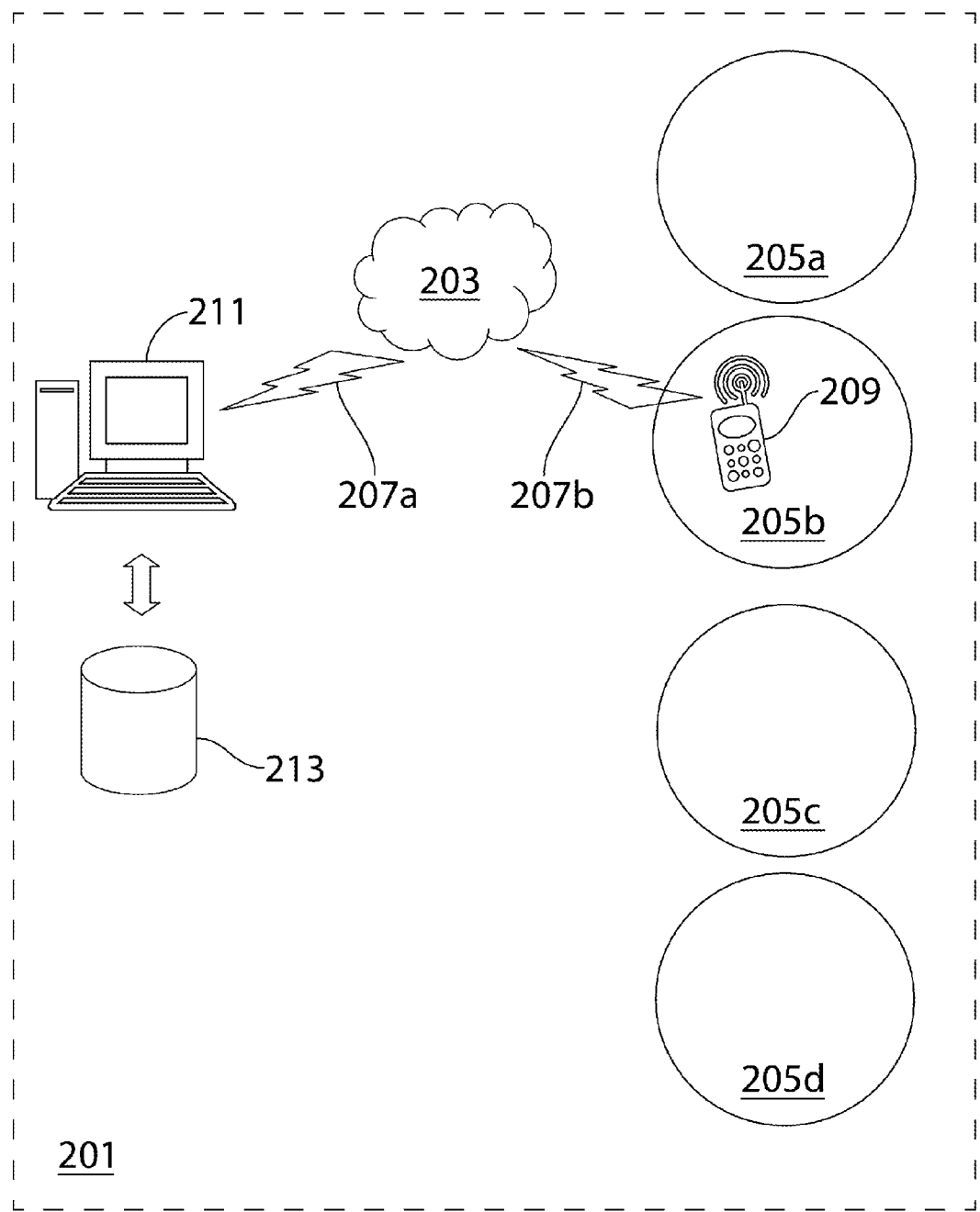
FIG. 1 is an illustration of a particular, non-limiting embodiment of a system which may be utilized to implement the methodologies described herein.

FIG. 1 illustrates one particular, non-limiting embodiment of a system which may be utilized to implement the methodologies described herein. As seen therein, the system 201 preferably comprises a network 203 equipped with a set of geo-fences 205. The geo-fences 205 consist of a set of areas 205*a-d* which are defined by geographic boundaries. Such boundaries may be defined, for example, in terms of latitude, longitude, and radius. Irregular areas may be supported in the systems and methodologies described herein as well.

Suitable network connections 207 are provided to allow a mobile communications device 209 to access a server 211 over the network 203. The server 211 maintains a list of the geo-fences 205 on the network 203 in an associated database 213, and the mobile communications device 209 is equipped with software, described in greater detail below, which allows the device to periodically query the server 211 for the set of geo-fences 205 which are proximal to location of the mobile communications device 209 at a given point in time.

The mobile communications device 209 in this particular embodiment has the ability to detect and report its location and accuracy using cell tower or Wi-Fi triangulation, and also has the ability to detect and report its location and accuracy using GPS. The mobile communications device 209 in this particular embodiment further has the ability to run a process in the background that can be triggered by the operating system of the device upon certain predefined events or conditions, and further has the ability to notify the background process when certain predefined location events have occurred. The server 211 in this particular embodiment has the ability to receive geo-fence entry and exit events from the mobile communications device, and is adapted to react accordingly.

Figure 2:
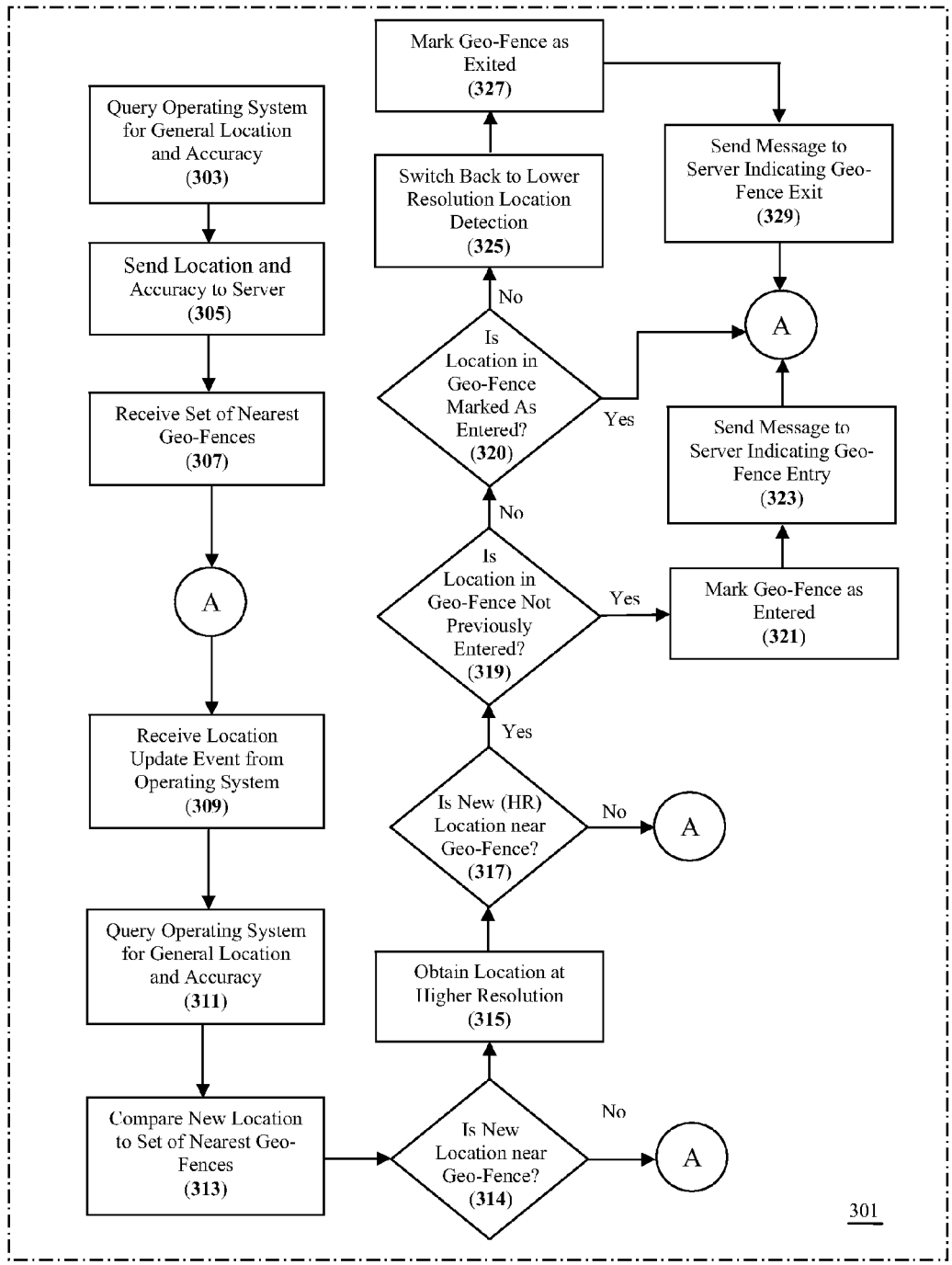
FIG. 2 is a flow chart of a particular, non-limiting embodiment of a method in accordance with the teachings herein.

FIG. 2 illustrates a particular, non-limiting embodiment of the methodology disclosed herein. As seen therein, in the particular embodiment 301 depicted, when a mobile communications device first installs the location detection application, the application queries the operating system 303 for the general location of the host device (this location is preferably determined by a lower resolution method such as cell tower or Wi-Fi hot spot triangulation) and the corresponding location accuracy.

The mobile device then sends the location and accuracy 305 data to the server, and requests the set of geo-fences proximal to it. The server responds with the requested set of proximal geo-fences 307. Preferably, the server accomplishes this by comparing the center of each geo-fence in the network to the location of the mobile communications device, and by including in the response a listing of all geo-fences for which the distance between the geo-fence and the mobile communications device is less than a predetermined minimum value.

The location detection application subscribes to location changes from the operating system of the mobile communications device. The operating system will then call the location detection application when the location of the mobile communications device has changed by a significant amount. The definition of "significant" for the purposes of this determination is preferably left up to the operating system, but will preferably be on the order of hundreds or thousands of meters.

Upon receiving a location update event 309 from the operating system of the mobile communications device, the location detection application retrieves from the operating system of the device the current location of the device and the accuracy associated with determining that location 311. The current location is again preferably determined by a lower resolution method, such as cell tower or Wi-Fi hot spot triangulation.

The location detection application then compares the new location of the device to the set of geo-fences 313. If the new location of the device is within a predefined distance of the nearest geo-fence 314, the location detection application switches to higher resolution location detection method, such as GPS location detection, and determines the location of the device with higher resolution 315. If the new location of the device thus determined is not within a predefined distance of the nearest geo-fence, then the process returns to POINT A.

Upon receiving a higher resolution location update 315, the location detection application compares the new location of the device to the set of geo-fences to determine if the new location is near a geo-fence 317. If it is determined that the new location is no longer within a predefined distance of the nearest geo-fence, the location detection application switches back to the lower resolution location detection mode, and returns the process to POINT A where the process awaits the next location update event 309.

If it is determined that the new location determined by the higher resolution update is within a geo-fence that was not previously entered 319, the device has entered a geo-zone. The location detection application marks the geo-fence as entered 321, and sends a message to the server indicating the geo-fence entry 323. The process then returns to POINT A. If it is determined that the new location determined by the higher resolution update is within a geo-fence that was previously entered 319, then it is determined whether the location is in a geo-fence marked as entered 320.

If it is determined whether the location is in a geo-fence marked as entered 320, the process returns to POINT A. However, if it is determined that the location is not within a geo-fence that is marked as entered 320, this means that the device has exited a geo-fence. The device then switches back to lower resolution location detection 325, and the location detection application marks the geo-fence as exited 327 and sends a message to the server indicating geo-fence exit 329. The process then returns to POINT A where periodically, or after traveling more than a predetermined distance from the location of the last request for the set of geo-fences proximal to the mobile communications device, the device will contact the server and request a refreshed set of nearby geo-fences.

The systems and methodologies disclosed herein are especially useful in implementing methodologies and algorithms that benefit from the knowledge of where users of mobile communications devices are with respect to one or more geo-fences. One example of such an implementation is an advertising or promotional campaign, wherein a marketer, promoter or other such entity may use the systems and methodologies described herein to identify potential members of a target audience. For example, the owner of a bricks-and-mortar retail establishment may wish to know when a consumer has come within a certain proximity to one of their stores. This knowledge may be used, for example, to expose the consumer to advertisements or to offer the consumer coupons, notices of special sales, or other incentives to entice them to enter the establishment.

Preferably, the foregoing objective is accomplished through the use of software which works in conjunction with the systems and methodologies disclosed herein to detect changes (with respect to one or more geo-fences) in the locations of mobile communications devices owned by consumers. The software preferably includes a software client, an instance of which may be installed on each of a plurality of mobile communications devices. The software client preferably communicates with one or more servers which may be utilized to implement a campaign. The software also preferably includes graphical user interfaces (GUIs) on the server side and/or on the client side, and these GUIs may be the same or different. The server side, the GUI may provide various functionalities to allow marketers, promoters or other users or entities to control or manipulate the system, especially for the purpose of planning, launching, managing or terminating a campaign.

For example, the GUI may provide the ability to adjust campaign throttling so that marketers have more control over how often a certain message is delivered. Thus, the GUI may allow an advertising or marketing campaign manager to set a specific message which is to be delivered to a mobile communications device upon entry and/or exit of a geo-fence. The message may be set to be delivered at any desired interval. For example, the message may be delivered only once, or it may be delivered periodically (e.g., every X hours). If the message is et to be delivered periodically, the interval may be set to default to a particular value (e.g., once every 12 hours).

The GUI is also preferably equipped with advanced location filtering capabilities. This feature may be useful, for example, for companies having many (e.g., hundreds or thousands) of geo-fences, where filtering may be vital to being able to readily identify sets of locations that have aspects in common for selection in a campaign. For example, the GUI may be equipped with advanced logical rules on tags and fields to allow users to obtain the exact set of locations that they want.

The GUI may also be equipped with functionalities which enable a user to operate on geo-locations in bulk. For example, the GUI may be equipped with functionalities that permits the user to upload information in bulk for the purpose of establishing or setting up new geo-fences, or for updating information about existing geo-fences (such as, for example, adding or removing tags or Wi-Fi information associated with geo-fences).

The GUI may also be equipped with a map view to allow a user to visualize location-based strategies on a map. This functionality preferably provides the user with the ability to move and resize geo-fences in the map view, thus facilitating the planning and execution of location-based strategies.

The GUI is also preferably equipped with the ability to send messages to a specific location, while referencing the location in the message itself. This may be accomplished, for example, by adding a variable into an advertising campaign at its creation so that the campaign will automatically insert the location name, address, city, state, zip code, or other identifying features of the geo-fence to which they were delivered.

The systems and methodologies described herein may utilize appropriate triggers for a campaign, especially those involving the delivery of marketing content to a mobile communications device associated with a consumer. Frequently, the trigger will be an event, such as the interaction between the consumer and a physical location, which may be deduced from the relative location of a geo-fence and a mobile communications device associated with the consumer. Examples of triggers may include the consumer entering or exiting a location, or the consumer scanning a bar code with, or entering a promotional code into, the client device.

Figure 3:
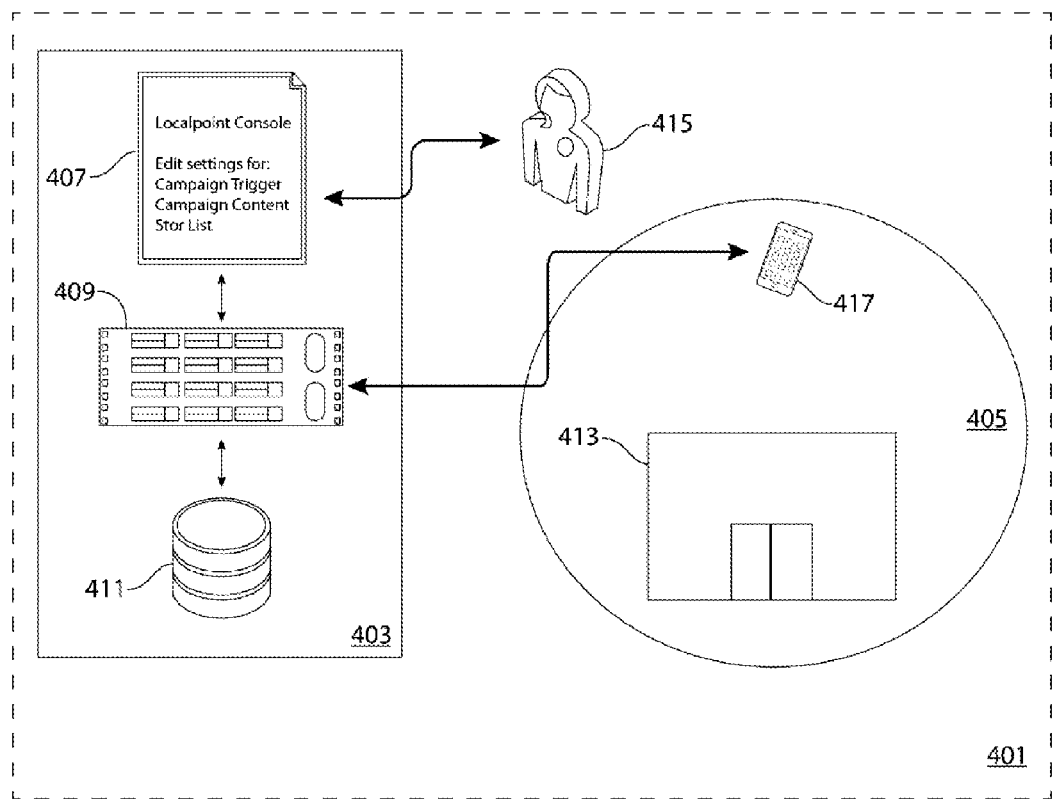
FIG. 3 is an illustration of a particular, non-limiting embodiment of a system for managing a marketing campaign over one or more geo-fences in accordance with the teachings herein.

FIG. 3 illustrates a particular, non-limiting embodiment of a system and methodology for the use of triggers in an advertising campaign in accordance with the teachings herein. As seen therein, the system 401 includes a campaign control system 403 which operates in conjunction with one or more geo-fences 405 (for simplicity of illustration, only a single geo-fence is depicted) to implement a marketing campaign. The campaign control system 403 includes at least one console 407, one or more application servers 409 and one or more databases 411. Each geo-fence 405 defines a region, which may consist of a location (such as, for example, a bricks-and-mortar store 413) and a radius.

In a typical implementation of this embodiment, the campaign is managed by a campaign manager 415 who utilizes the console 407 to edit settings pertinent to the campaign. These settings may define, for example, the relevant triggers, a list of participating stores or locations, and the messages, offers, coupons and other campaign content.

Once the parameters of the campaign are established, the application servers 309 communicate as necessary with one or more mobile communications devices 417 to implement the campaign. This may involve, for example, tracking the location of each mobile communications device 417 with respect to one or more geo-fences 405 and storing or updating this information as necessary in the associated database 411. Each mobile communications devices 417 preferably has a software client installed thereon to facilitate this process.

Various parameters may be defined for a particular campaign. These parameters may include, for example, campaign start dates and times which define, respectively, the dates and times at which campaign materials may be sent to client devices. Similarly, these parameters may include campaign end dates and times which define, respectively, the dates and times at which campaign materials will no longer be sent to client devices. These parameters may also include promotion expiration dates, which mark the last date on which the promotion will be accepted at participating locations (preferably, the promotion expiration date for a campaign will be on or after the campaign end date).

Each campaign defined in the system may also have a status associated with it, which indicates where the campaign is in its life cycle. In a preferred embodiment, the status has a value selected from the group consisting of "scheduled", "active", "completed" or "stopped".

A campaign with the status "scheduled" refers to a campaign which has been entered in the console, but has a start date in the future. Preferably, such a campaign may be edited any time before the start date, and possibly after the start date.

A campaign with the status "active" refers to a campaign which is currently running While such campaigns may be edited in some embodiments, preferably, promotions which have already been delivered to a mobile communications device will not be updated to reflect such edits unless the client on the mobile communications device refreshes the information received from the server.

A campaign with the status "completed" refers to a campaign whose end date has passed. Any promotions which are associated with the campaign may remain active (depending on their expiration date), but no additional promotions will be sent to client devices. Preferably, completed campaigns cannot be edited in the system.

A campaign with the status "stopped" refers to a campaign which did not reach its end date, but which was stopped in the console. Stopped campaigns preferably do not send any additional promotions associated with the campaign to client devices, although it is preferred that any promotions already sent are not removed from the client device. It is also preferred that stopped campaigns can be edited and restarted.

The systems and methodologies described herein may have the ability to generate various reports. These reports may be designed to allow a campaign manager to measure the success of a campaign, either while it is active or after it has been completed or stopped. Preferably, the console gathers data from the client application for these reports. Such data may include, for example, campaign activity (across locations), check-ins by location (across campaigns), location ranking by level of activity, the number of announcements delivered to client devices (these may be sorted, for example, by campaign and/or location), and the number of announcements opened on client devices (these may be sorted, for example, by campaign and/or location).

Various campaign types may be defined in the systems and methodologies described herein. For example, the campaign may be of a check-in type. This type of campaign is triggered when the user of a mobile communications device selects a check-in option when they have entered a location. The client application on the user's device sends the check-in to the server, which looks for active check-in campaigns for that location. The server then sends the promotional content from the active campaign to the mobile communications device.

The campaign may also be of a geo-fence exit type. This type of campaign will be triggered when a mobile communications device leaves a geo-location. The trigger causes the software client on the mobile communications device to send the exit event to the server. The server then looks for an active geo-fence exit campaign for that location and sends a message from the active campaign to the client device.

The campaign may also be of an announcement type. This type of campaign sends scheduled announcements or promotions to client devices which are in a participating location when the announcement is sent.

Various event types may also be defined in the systems and methodologies described herein. These include, without limitation, geo-fence entry events and message impression events. A geo-fence entry event is recorded when a mobile communications device with the software client installed thereon enters the geo-fence of a location defined in the console. A message impression event is recorded when a software client resident on a mobile communications device detects the opening of a notification, announcement, message, or associated promotion (the message may be opened multiple times).

The campaign console described herein may be supported by a variety of browsers. By way of example, the campaign console may be implemented over the Windows Internet Explorer web browser.

Preferably, the systems and methodologies described herein utilize a client application, each instance of which runs on a mobile communications device. The client application may be downloaded to the host device from a suitable source, such as the Apple App Store or the Android Market. The client application preferably communicates with the application server and campaign console to determine when the host device is near a location (i.e., geo-fence) of interest, and sends any appropriate data to (and receives any appropriate content from) the application server.

The systems and methodologies disclosed herein may utilize various means to ascertain the location of a mobile communications device with respect to a geo-fence. For example, if a geo-fence has a Mac Address (BSSID) or an SSID (Wi-Fi ID) associated with it, this information may be entered into the location profile associated with the geo-fence. The software client resident on a mobile communications device may then use this information to determine the proximity of the host device to the geo-fence. The use of BSSID is especially preferred, since it is a unique identifier for each location. By contrast, there may be several identical SSIDs in the same general area, though the client software will typically be able to use network positioning to determine the proximity of the host device to a geo-fence of interest.

The systems and methodologies disclosed herein preferably provide a campaign manager with the ability to define the parameters of a geo-fence. In a preferred embodiment, each geo-fence is a location in combination with a radius. This radius, which may be set by the campaign manager, is preferably about 100 m, but may be smaller or larger. For example, the radius of the geo-fence may be 500 m, 1000 m, or even as high as 5000 m.

The locations used to define the geo-fences may also be set by the campaign manager. Preferably, these locations are specified as a full or partial address which is entered into the database by way of the console. Such addresses may be entered singularly, or as a batch. The console preferably validates any entered addresses by comparing them to addresses defined in a suitable database, such as the Google address database, and maintains a running error log to notify the campaign manager of any errors in any addresses entered. If the address is ambiguous, the campaign manager may be prompted to select the correct address from a listing of possible addresses.

The above description of the present invention is illustrative, and is not intended to be limiting. It will thus be appreciated that various additions, substitutions and modifications may be made to the above described embodiments without departing from the scope of the present invention. Accordingly, the scope of the present invention should be construed in reference to the appended claims.

What is claimed is:

1. A method for determining the location of a mobile communications device with respect to a geo-fence, comprising:

providing a mobile communications device equipped with an operating system and having a location detection application resident thereon;

providing a server which is in communication with the local detection application over a network, and which maintains a geo-fence database;

querying the operating system for a first data set comprising the general location of the mobile communications device and the corresponding location accuracy;

transmitting the first data set to the server;

receiving from the server, in response to the transmission of the first data set, a first set of geo-fences in the proximity of the general location;

receiving, from the operating system, a notification that the location of the mobile communications device has changed by an amount that exceeds a predetermined threshold;

querying the operating system for a second data set comprising the general location of the mobile communications device and the corresponding location accuracy;

transmitting the second data set to the server;

receiving from the server, in response to the transmission of the second data set, a second set of geo-fences in the proximity of the general location;

if the location defined in the second data set is within a predefined distance of the nearest geo-fence, then
 (a) using the GPS location detection to obtain a third data set comprising the GPS location of the mobile communications device,
 (b) comparing the GPS location to the second set of geo-fences, and
 (c)(i) if the GPS location is not within the predefined distance of the nearest geo-fence, then using the location defined in the second data set as the location of the mobile communications device,
 (ii) if the GPS location is within a new geo-fence distinct from the geo-fence defined in the second data set, then
  (1) marking the new geo-fence as having been entered, and
  (2) sending a message to the server indicating entry of the new geo-fence,
 (iii) if the GPS location is not within the geo-fence defined in the second data set, then sending a message to the server indicating that the geo-fence defined in the second data set has been exited.

2. A method for determining when a mobile communications device has crossed a geo-fence, comprising:
 providing a mobile communications device equipped with an operating system and having a location detection application resident thereon, wherein the mobile communications device is in communication with a server over a network, and wherein the server maintains a geo-fence database;
 receiving, from the operating system, a notification that (a) the location of the mobile communications device has changed by an amount that exceeds a predetermined threshold, or (b) that a period of time has passed;
 querying the operating system for a data set comprising the general location of the mobile communications device and the corresponding location accuracy;
 transmitting the data set to the server;
 receiving from the server, in response to the transmission of the data set, a set of geo-fences proximal to the general location;
 wherein, if the location defined in the data set is within a predefined distance of the nearest geo-fence in the set of geo-fences, then
 (a) ascertaining the GPS location of the mobile communications device, and
 (b) comparing the GPS location to the nearest geo-fence defined by the data set;
  wherein, if the GPS location is within a geo-fence that was previously not entered, then
  (a) marking the geo-fence as entered, and
  (b) sending a message to the server indicating entry of the geo-fence;
   wherein, if the GPS location is not within the predefined distance of the nearest geo-fence in the first set of geo-fences, then using the location defined in the data set as the location of the mobile communications device; and
   wherein, if the GPS location is within a new geo-fence distinct from the geo-fence indicated by the data set, then
   (1) marking the new geo-fence as having been entered, and
   (2) sending a message to the server indicating entry of the new geo-fence, and
   (iii) if the GPS location is not within the geo-fence indicated by the data set, then sending a message to the server indicating that the geo-fence defined in the data set has been exited.

3. The method of claim 2, wherein the predefined distance is less than 1000 meters.

4. The method of claim 2, wherein the predefined distance is less than 500 meters.

5. The method of claim 2, wherein the predefined distance is less than 200 meters.

6. The method of claim 2, wherein the location detection application queries the operating system for the data set when the location detection application is first installed.

7. The method of claim 2, wherein the method is performed in an iterative process.

8. The method of claim 7, wherein each iteration of the process is triggered by receiving, from the operating system, a notification that the location of the mobile communications device has changed by an amount that exceeds a predetermined threshold.

9. The method of claim 7, wherein each iteration of the process is triggered by receiving, from the operating system, a notification that a period of time has passed.

10. The method of claim 7, wherein each iteration of the process is triggered by the first event to occur between (a) receiving, from the operating system, a notification that the location of the mobile communications device has changed by an amount that exceeds a predetermined threshold, or (b) receiving, from the operating system, a notification that a period of time has passed.

11. The method of claim 2, wherein the server determines the set of geo-fences proximal to the general location by comparing the distance from the center of each geo-fence in the database to the general location, and returning those geo-fences for which the distance is less than a threshold amount.

12. The method of claim 11, wherein the threshold amount is less than 1000 meters.

13. The method of claim 11, wherein the threshold amount is less than 500 meters.

14. The method of claim 11, wherein the threshold amount is less than 200 meters.

15. The method of claim 2, wherein the location detection application subscribes to location changes from the operating system.

16. The method of claim 15, wherein the operating system calls the location detection application when the difference between the general location in the most recent data set and the general location provided by the operating system exceeds a threshold amount.

17. The method of claim 2, wherein the step of querying the operating system for a data set comprising the general location of the mobile communications device and the corresponding location accuracy is repeated each time the location detection application receives a location update event from the operating system.

* * * * *